United States Patent [19]

Lorton et al.

[11] Patent Number: 5,023,637
[45] Date of Patent: Jun. 11, 1991

[54] FILM MARKING APPARATUS

[76] Inventors: Tina L. E. Lorton, 735 Sunrise Blvd.; Timothy R. Eno, 12 Eno's La., both of Forked River, N.J. 08731

[21] Appl. No.: 562,824

[22] Filed: Aug. 6, 1990

[51] Int. Cl.$^5$ ............................................. G03B 17/24
[52] U.S. Cl. ..................................... 354/106; 352/92; 352/236
[58] Field of Search ............... 354/105, 106, 107, 108, 354/109; 352/92, 236

[56] References Cited

U.S. PATENT DOCUMENTS

| | | | |
|---|---|---|---|
| 3,490,844 | 1/1970 | Sapp, Jr. .......................... | 354/105 X |
| 3,703,129 | 11/1972 | Goshima ............................ | 354/106 |
| 3,843,956 | 10/1974 | Kauneckas ........................ | 354/108 |
| 4,143,956 | 3/1979 | Miyagawa ........................ | 354/106 |
| 4,194,817 | 3/1980 | Staudacher et al. ............. | 352/92 X |
| 4,330,186 | 5/1982 | Hattori ............................... | 354/106 |
| 4,384,771 | 5/1983 | Sakurada et al. ................. | 354/105 |
| 4,742,369 | 5/1988 | Ishii et al. ......................... | 354/106 X |
| 4,825,233 | 4/1989 | Kanai et al. ....................... | 354/106 |

FOREIGN PATENT DOCUMENTS 60-166938  8/1985  Japan ................................. 354/106

*Primary Examiner*—A. A. Mathews
*Assistant Examiner*—Howard B. Blankenship

[57] ABSTRACT

A still camera having a marking mechanism for forming a message or title along one edge of each picture taken by the camera. The marking mechanism is preferably a dot matrix printer synchronized with the motor that advances the film after each picture-taking event. During the film-advance period the printer mechanism operates automatically to form a message (title) on the previously-taken picture. A manual keyboard is provided to select (vary) the message.

4 Claims, 1 Drawing Sheet

FILM MARKING APPARATUS

BACKGROUND AND SUMMARY OF THE INVENTION

This invention relates to still cameras, and particularly to a mechanism for printing (marking) identifier information on each picture frame of the film after each picture-taking event. The information can, for example, be the date the picture is taken, or the names of the people in the picture, or the occasion of the picture-taking event (e.g. seventh birthday), or the location at which the picture is being taken.

This invention could be useful to many persons who might have occasion to use a still camera, e.g. police personnel engaged in surveillance activities, attorneys taking photographic evidence of accidents, botanists, archeologists, vacationers, and other persons desiring to have explanatory information printed directly on pictures as they are being taken.

It is already known to provide identifier information on film frames (pictures) while they are being taken. We are aware of the following U.S. patents showing mechanisms for this purpose: 3,703,129 to Goshima et al, 4,143,956 to F. Miyagawa, 4,384,771 to Sakurada et al, 4,742,369 to Ishii et al, and 4,825,233 to Kanai et al.

The present invention is concerned with a marking mechanism that can be operated and controlled with solid state circuitry, such that the mechanism can be used on relatively small size cameras. The mechanism is designed so that the film-marking action takes place during the film-advance cycle (after the picture has been taken); control circuitry in the mechanism makes it possible for the person taking the picture to delay his decision on the wording of the information until after the picture has been taken (i.e. until he is certain of what the picture shows).

THE DRAWINGS

DESCRIPTION OF A PREFERRED EMBODIMENT OF THE INVENTION

Figure 1:
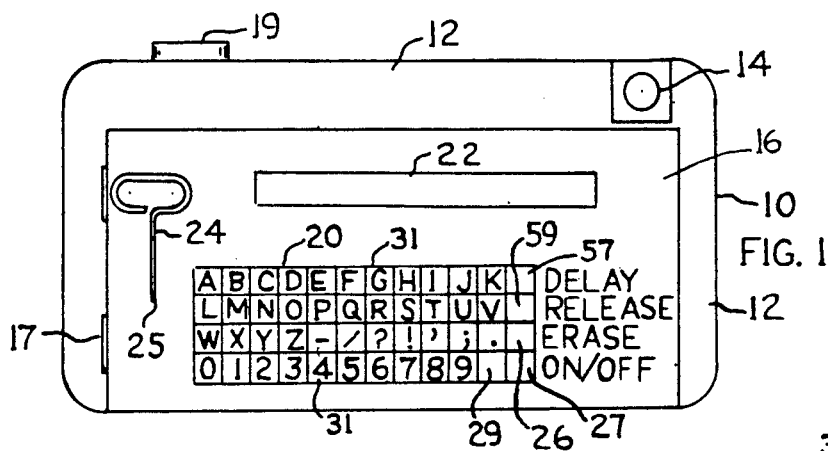
FIG. 1 is a rear view of a camera having one form of the invention incorporated into the back cover.

FIG. 1 shows a conventional still camera 10 having a case structure 12, view finder 14, a back cover 16 hingedly connected to case structure 12 via hinges 17, and a shutter release button 19. FIG. 1 is taken from behind the camera to illustrate the physical location of a printer mechanism incorporated into cover 16. The mechanism comprises a manual keyboard 20 containing forty eight pushbuttons, and a display window 22 having space for displaying ten characters (letters, numbers, etc.) that have been punched into a circuit memory by use of the keyboard (pushbuttons).

The keyboard is preferably inset into the cover 16 surface in order to prevent accidental actuation of the pushbuttons. A key 24 is provided to apply operating pressure to the inset pushbuttons. The key is shown on the outer face of cover 16. The key can be frictionally snapped into a mating recess in the cover 16 surface where it can be frictionally retained by the recess edge surfaces until needed. The key will have a plastic tip 25 thereon that can be oriented to exert a punching action on individual pushbuttons in keyboard 20. As each pushbutton is depressed the corresponding character will appear in window 22. The pushbutton designated by numeral 27 is an ON-OFF switch for the control circuit; it must be punched first in order for the other pushbuttons to be operable. The pushbutton designated by numeral 29 is a "blank space" character button. It is pushed when it is desired to separate numbers or words in the message printed onto the film.

The printing mechanism is preferably designed (oriented) to mark a message along the lower edge of the film during the film advancement period, i.e. after one picture has been taken and while the film is being shifted to bring a new portion of the film into registry with the picture-taking lens. Film advance is accomplished by a small electric motor located within the camera case at the take-up spool. The characters punched into the circuit via keyboard 20 are stored in alpha numeric symbolic code (ASCII code equivalent) until needed for the printing (marking) operation. The printing process may be triggered (started) by the circuit that is used to energize the film advance motor. In a preferred form of the invention a delay circuit is incorporated into the memory (character storage) such that the words (message) are centered along the lower edge of each frame (picture).

Figure 2:
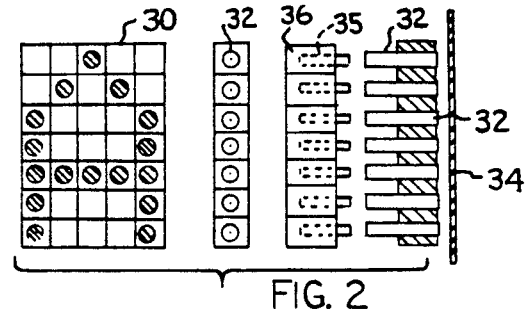
FIGS. 2 through 4 are schematic illustrations of printer devices that can in practice of the invention.
Figure 3:
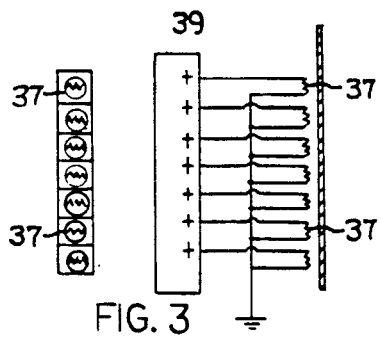
Figure 4:
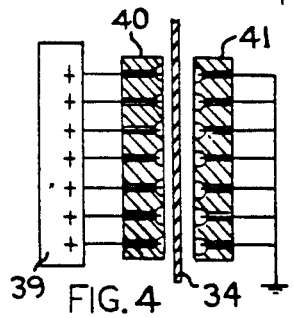

FIGS. 2 through 4 show various types of dot matrix printers than can be employed in practice of the invention. Referring to FIG. 2, there is shown a dot matrix 30 forming the letter (character) A. The matrix contains five vertical columns, that form seven horizontal rows; the matrix is thus a seven by five matrix. The printing mechanism comprises five impact pins 32 arranged in a vertical columnar relationship along one face of photographic strip 34 at its lower edge. Each pin 32 is suitably guided for horizontal movement against (and through) the film strip so as to form a small pin hole in the film.

A small solenoid mechanism 36 is located to the left of each impact pin 32. Each solenoid includes an armature 35 that acts as a hammer for the associated pin 32. Rightward motion of each hammer (armature) 35 causes the associated pin 32 to form a pin hole in film strip 34. The hammer stroke can be achieved by a return spring for the armature or by the electro-magnetic force of the solenoid, depending on the particular circuitry employed.

In FIG. 2 the direction of film strip advance is normal to the plane of the paper. As the film strip advances, the solenoids 36 are selective activated so that after the film strip has advanced a distance corresponding to five columns of the dot matrix 30 a character A will be formed on the film strip. The nature of each character (letter, number, etc.) is determined by the frequency pattern of the solenoid 36 actuation. This frequency can be controlled by the FIG. 6 circuitry.

FIG. 3 shows another dot matrix printer that can be employed. In this case each dot is formed on the film strip by a small disk 37 of resistive material. When an electrical current is passed through a particular resistive disk a small pin hole is burned into the registering section of film strip 34. The frequency pattern of resistive disk energization is controlled by a control circuit designated generally by numeral 39 in FIG. 3.

FIG. 4 shows a dot matrix printer means, comprising two insulator blocks 40 and 41, each block having seven small spherical cavities containing electrodes facing one surface of the advancing film strip 34. Application of a voltage to one of the electrodes in block 40 will cause an arc to leap across the gap leading to the other registering electrode in block 41, thereby forming a small pin hole in the intervening film strip.

Figure 5:
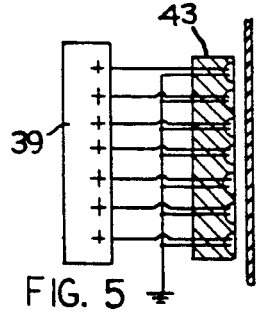
FIG. 5 is illustration of an electric circuit that can be used in practice of the invention.

FIG. 5 shows a dot matrix printer means that comprises a single insulator block 43 having seven cavities arranged in a vertical columnar relationship. Each cavity contains two spaced electrodes, such that when a voltage is applied to one electrode the resultant spark-over to the associated electrode produces a brief flicker of light that provides a dot exposure on the surface of film strip 34.

Figure 6:
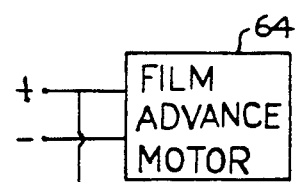
FIG. 6 is an illustration of control circuitry for use with the printer devices, connected to one type of printer mechanism.

The dot matrix printer mechanisms shown in FIGS. 2 through 5 can be controlled by the control circuit shown in FIG. 6. That circuit includes forty-eight pushbuttons that form the keyboard 20 (FIG. 1); only five of the pushbuttons are shown in FIG. 6, i.e. the ON-OFF button 27, the "blank space" button 29, the "erase" button 26, and two representative "character" buttons 31.

When a character button is manually depressed electrical signals are directed into an encoder mechanism 45 that converts the signal into a binary form ASCII code equivalent. The binary signals are temporarily stored in a memory 47. Such binary signals are also directed through signal lines 49 to a decoder 50 that forms part of the character display. Decoder 50 converts the ASCII code into arrays of small dots (pixels) or line segments. Each converted code is sent from decoder 50 to the rightmost shift register 52, which acts to illuminate an associated set of LEDs (light emitting diodes) in window 22, to thereby form a visible character corresponding to the depressed character button 31.

As each additional character is encoded in encoder mechanism 45 and sent through decoder 50, the characters are shifted to the left, from one shift register to the next shift register, for display by the associated LEDs in window 22. After the first ten characters have been displayed the characters to the far left are scrolled off the display window 22 and stored in a memory 54. When the maximum number of characters that can be printed in one title is reached (e.g. twenty-four characters), the keyboard 20 no longer electronically responds to manual pressure applied to the pushbuttons.

An erase button 26 can be used to delete the character furthest to the right in the display window; when an erase signal is generated the remaining characters will be shifted one space to the right, i.e. off the screen. Characters that have been scrolled off the display into memory 54 will be redisplayed at the left end of window 22. The erase button will be used when a pushbutton error is made during the process of inputting a message into the circuit.

The dot matrix printer mechanisms (FIGS. 2 or 3 or 4 or 5) will begin to operate as a response to initial energization of the film advance motor that takes place after each picture-taking event. However a control may be imposed on the circuitry to permit the photographer to delay the printer operation until he can decide on the message to be printed. FIG. 1 shows the keyboard equipped with a delay button 57 and release button 59. These switch buttons can be incorporated into the actuation circuitry for the film advance motor, such that the film advance is delayed until the desired message has been inputted into the system. Thus, the message can be conceptualized and fed into memory 47 before or after the picture-taking event (by using or not using buttons 57 and 59).

The control circuitry of FIG. 6 includes a decoder 60 that is controlled by timed pulses generated by an oscillator 62. The oscillator is energized as a response to initial energization of film advance motor 64, such that the oscillator delivers electrical pulses through a signal line 65 in synchronism with the film advance speed. The term "synchronism": is here used to mean a condition wherein the pulses in line 65 cause the various dot columns in matrix 30 (FIG. 2) to be spaced the desired distance for forming a readable message along the lower edge of a picture frame, i.e. between the end limits of a given picture.

Decoder 60 transforms the memorized characters in memory 47 into electrical pulses in output lines 70 leading to the printer components; each pulse forms one dot in the dot matrix. As the film is advanced by motor 64 a series of dot patterns are formed on the film near its lower edge. Each dot pattern forms one character in the message printed onto a given picture frame. The message can be changed from one picture to the next picture by appropriate operation of keyboard 20.

In some instances it may be necessary or desirable to center the message (title) on the picture, such that the first and last characters in the message are spaced the same distance from the leading and trailing edges of a given picture. A message centering characteristic can be achieved by incorporating a counter and delay circuit into memory 47; the delay will occur in the transfer of the memorized signals from memory 47 to decoder 60 when the decoder is first set into operation by oscillator 62.

Arithmetically the desired delay time will be one half the difference in the number of characters (i.e. letters or numbers or blank spaces) potentially available on a given picture length and the number of characters in a given message. One method of achieving the delay is to electrically fill memory 47 with blank delay pulses equivalent to one half the picture length, and then to subtract one pulse every time two characters (pushbuttons) are operated. The effect will be to prevent decoder 60 from extracting signals out of memory 47 until the film has been advanced to a point where the subsequently printed title is centered along the lower edge of the associated picture. The length of the delay period will be inversely related to the length of the message being printed.

FIG. 6 shows a dot matrix printer mechanism constructed generally similarly to the printer mechanism shown in FIG. 4. However, the FIG. 6 circuitry can also be used with the printer devices shown in FIGS. 2, 3 and 5.

In some cases it may be desired to form a message that includes (or consists of) the date of the picture-taking event, i.e. the month, day and year. The keyboard 20 could be supplemented (or replaced) with a continuously-operating clock mechanism for generating month, day and year input signals to encoder 45.

A principal advantage of the illustrated mechanism is that it can be a miniaturized solid state system sized small enough to fit onto (into) the back cover of a small camera. Also, the mechanism is designed to carry out the film marking operation during the film-advance period, which gives the photographer some latitude in when he has to make the decision on the message (title) that needs to be printed.

We claim:

1. A still camera comprising:
   a film advance motor operable during the period between successive picture-taking events;
   a dot matrix printer means operable to print a single column of dots on the film in a direction normal to the direction of film advance, whereby repeated operation of the printer means forms a message of individual characters extending parallel to the direction of film advance;
   a manual keyboard means;
   a memory receiving signals generated by the keyboard means;
   oscillator means operable to generate electrical pulses in synchronism with the film advance speed; and
   a clocked decoder means connected to the memory and controlled by the oscillator means so that the characters printed on the film during the film-advance period correspond to the characters originally put into the memory by operation of the keyboard.

2. The camera of claim 1, wherein the dot matrix printer means is selected from the group consisting of an impact wire matrix printer means, a thermal resistive disk printer means, a spark ignition light generator printer means, and an arcing spark printer means.

3. The camera of claim 1, and further comprising a counter and delay means operable to center the characters within each frame of the film, said counter and delay means including means for subtracting the characters stored in the memory from the character spaces available within each frame, and dividing the difference in two.

4. The camera of claim 3, wherein each character contains approximately five dots in the direction of film advance and seven dots in each column taken normal to the direction of film advance.

* * * * *